US012592816B2

(12) United States Patent
Yoshida

(10) Patent No.: US 12,592,816 B2
(45) Date of Patent: Mar. 31, 2026

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD EXECUTED BY COMMUNICATION DEVICE FOR AUTHENTICATION

(71) Applicant: BROTHER KOGYO KABUSHIKI KAISHA, Nagoya (JP)

(72) Inventor: Seiya Yoshida, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 60 days.

(21) Appl. No.: 18/621,689

(22) Filed: Mar. 29, 2024

(65) Prior Publication Data

US 2024/0430076 A1    Dec. 26, 2024

(30) Foreign Application Priority Data

Jun. 23, 2023    (JP) ................................. 2023-103458

(51) Int. Cl.
  *H04L 9/08*      (2006.01)
  *G06F 3/12*      (2006.01)
        (Continued)

(52) U.S. Cl.
  CPC .......... *H04L 9/0825* (2013.01); *G06F 3/1222* (2013.01); *G06F 3/1238* (2013.01);
        (Continued)

(58) Field of Classification Search
  None
  See application file for complete search history.

(56) References Cited

U.S. PATENT DOCUMENTS 6,725,269 B1 *  4/2004  Megiddo ............... H04L 63/102
                                                  709/228
2008/0022090 A1 *  1/2008  Kishimoto ......... H04N 1/00464
                                                  713/156
                    (Continued)

FOREIGN PATENT DOCUMENTS

JP        2013-173285 A      9/2013
JP        2018-198400 A      12/2018

*Primary Examiner* — Michael W Chao
(74) *Attorney, Agent, or Firm* — KENEALY VAIDYA LLP

(57)        ABSTRACT

A communication device may, under a specific state where a plurality of user identification information and a plurality of key information are stored in association with one biometric authentication information in a first memory, acquire two or more user names; display, on a display unit, a first selection screen; in response to sending an authentication request to a server, receive verification information from the server; in a case where authentication succeeds, a specific user name is selected on the first selection screen and the verification information is received from the server, acquire signature information created by encrypting the verification information by using a specific private key; and send the specific user identification information and the created signature information to the server.

14 Claims, 11 Drawing Sheets

(51) Int. Cl.
  *H04L 9/32*    (2006.01)
  *H04N 1/44*    (2006.01)
(52) U.S. Cl.
  CPC .......... *G06F 3/1287* (2013.01); *H04L 9/3231*
    (2013.01); *H04L 9/3247* (2013.01); *H04N*
            *1/442* (2013.01)

(56)     References Cited

U.S. PATENT DOCUMENTS

| | | | | |
|---|---|---|---|---|
| 2012/0144464 A1* | 6/2012 | Fakhrai | .............. | H04L 63/0815 726/5 |
| 2015/0096001 A1* | 4/2015 | Morikuni | ............. | H04L 63/123 726/7 |
| 2015/0116754 A1* | 4/2015 | Mukai | ................... | G06F 3/1234 358/1.14 |
| 2016/0371039 A1* | 12/2016 | Mizuno | ................ | G06F 3/1234 |
| 2017/0052745 A1* | 2/2017 | Kanematsu | .......... | H04N 1/4433 |
| 2017/0237726 A1* | 8/2017 | Wang | .................... | H04W 12/06 726/7 |
| 2018/0004928 A1* | 1/2018 | Hayashi | .............. | H04L 63/0853 |
| 2018/0341759 A1* | 11/2018 | Sato | ...................... | G06F 21/608 |
| 2020/0186533 A1* | 6/2020 | Takagi | ................... | G06F 21/629 |
| 2020/0327219 A1* | 10/2020 | Bolimovsky | ......... | H04W 12/68 |
| 2021/0037004 A1* | 2/2021 | Gordon | .............. | H04L 63/0815 |
| 2021/0051012 A1* | 2/2021 | Law | .................... | H04L 63/0807 |
| 2021/0133307 A1* | 5/2021 | Kobayashi | .......... | G06F 21/6218 |
| 2021/0336950 A1* | 10/2021 | Miyamoto | ............ | H04L 9/3271 |
| 2022/0147600 A1* | 5/2022 | Funayama | .............. | G06F 21/35 |
| 2022/0215384 A1* | 7/2022 | Livingston | ........... | G06Q 20/401 |
| 2022/0255931 A1* | 8/2022 | Avetisov | .............. | H04L 9/3247 |
| 2023/0171252 A1* | 6/2023 | Stocker | ............... | H04L 63/0884 726/5 |
| 2023/0261854 A1* | 8/2023 | Dottax | ................ | H04L 63/0853 380/278 |
| 2024/0020376 A1* | 1/2024 | Li | ............................ | G06F 21/31 |
| 2024/0121098 A1* | 4/2024 | Herder, III | ........... | H04L 9/3255 |
| 2024/0121238 A1* | 4/2024 | Chin | ................... | H04L 63/0853 |
| 2025/0047661 A1* | 2/2025 | Berbenetz | ............ | H04L 67/306 |
| 2025/0088504 A1* | 3/2025 | Liu | .................... | H04L 63/0838 |

* cited by examiner

FIG. 1   Communication System 2

FIG. 2

Authentication Table 64A

| RPID | Key ID | User ID | Private Key | User Name |
|------|--------|---------|-------------|-----------|
| URL1 | KEYID1 | user1 | PRK1 | aaa_company |
| URL1 | KEYID2 | user2 | PRK2 | aaa_home |
| ... | ... | ... | ... | ... |

Authentication Table 64B

| RPID | Key ID | User ID |
|------|--------|---------|
| URL1 | KEYID1 | user1 |
| URL1 | KEYID2 | user2 |
| ... | ... | ... |

Management Table 242

| RPID | Key ID | User ID | Public Key | User Name | Job ID | Serial Number |
|------|--------|---------|------------|-----------|--------|---------------|
| URL1 | KEYID1 | user1 | PUK1 | aaa_company | job1 | SN2 |
| URL1 | KEYID2 | user2 | PUK2 | aaa_home | job2 | SN2 |
| ... | ... | ... | ... | ... | ... | ... |

FIG. 3

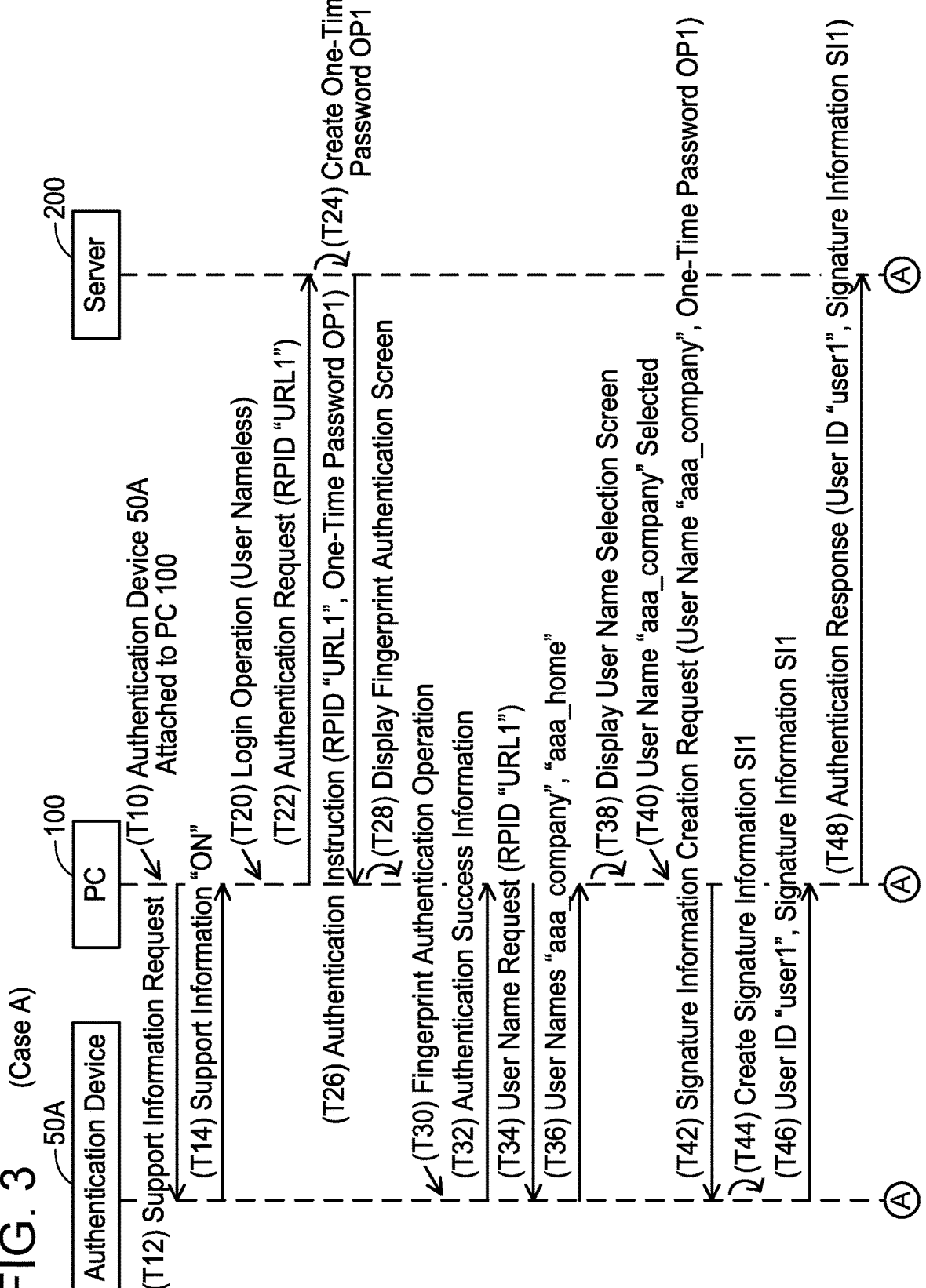

(Case A)

50A — Authentication Device

100 — PC

200 — Server (T10) Authentication Device 50A Attached to PC 100

(T12) Support Information Request (T14) Support Information "ON"

(T20) Login Operation (User Nameless)

(T22) Authentication Request (RPID "URL1")

(T24) Create One-Time Password OP1

(T26) Authentication Instruction (RPID "URL1", One-Time Password OP1)

(T28) Display Fingerprint Authentication Screen (T30) Fingerprint Authentication Operation (T32) Authentication Success Information (T34) User Name Request (RPID "URL1")

(T36) User Names "aaa_company", "aaa_home"

(T38) Display User Name Selection Screen (T40) User Name "aaa_company" Selected (T42) Signature Information Creation Request (User Name "aaa_company", One-Time Password OP1)

(T44) Create Signature Information SI1

(T46) User ID "user1", Signature Information SI1

(T48) Authentication Response (User ID "user1", Signature Information SI1)

Ⓐ

(Continuation of FIG. 3)

FIG. 5 (Case B)

FIG. 7

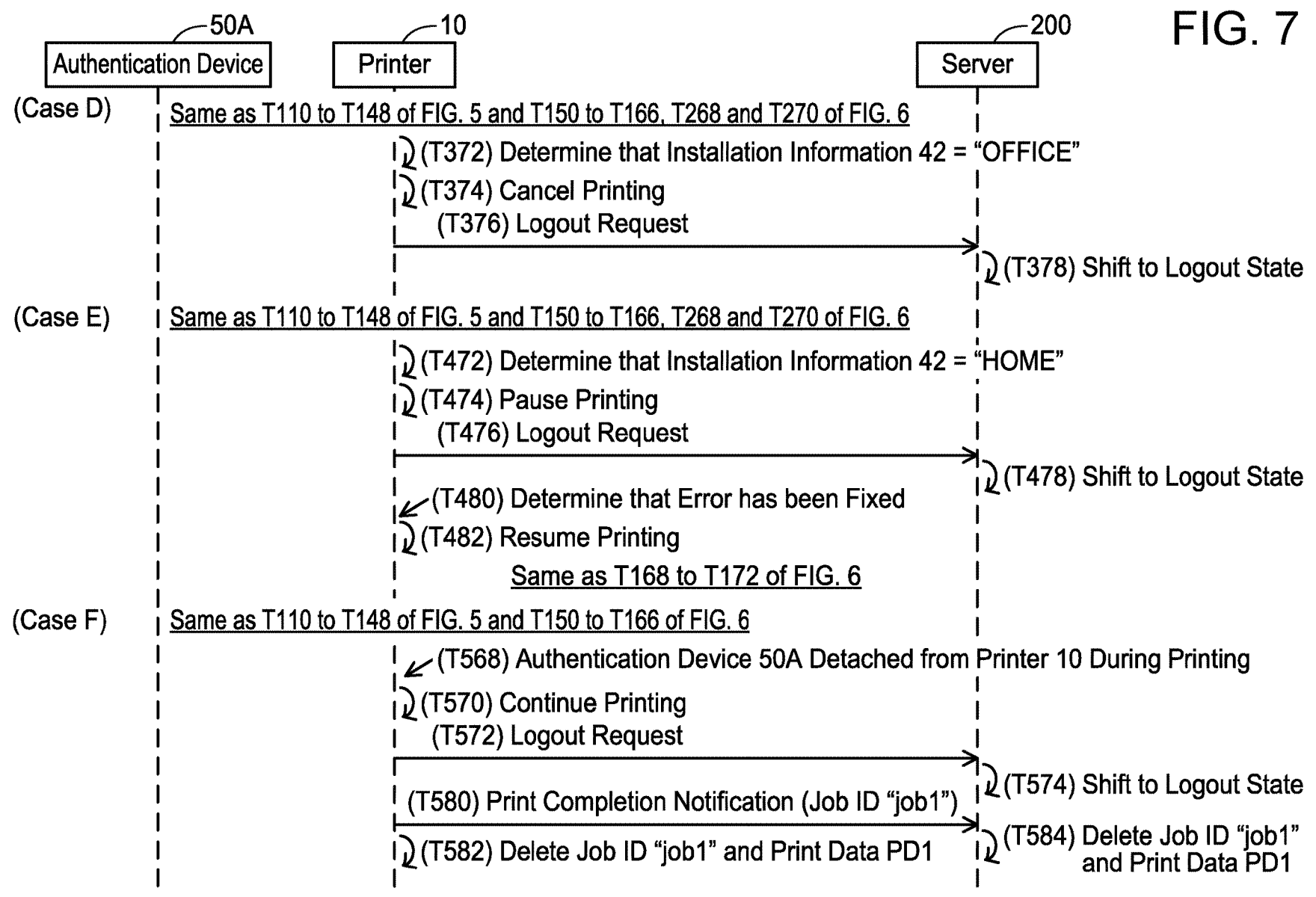

Authentication Device 50A — Printer 10 — Server 200

(Case D)
Same as T110 to T148 of FIG. 5 and T150 to T166, T268 and T270 of FIG. 6
(T372) Determine that Installation Information 42 = "OFFICE"
(T374) Cancel Printing
(T376) Logout Request
(T378) Shift to Logout State

(Case E)
Same as T110 to T148 of FIG. 5 and T150 to T166, T268 and T270 of FIG. 6
(T472) Determine that Installation Information 42 = "HOME"
(T474) Pause Printing
(T476) Logout Request
(T478) Shift to Logout State
(T480) Determine that Error has been Fixed
(T482) Resume Printing
Same as T168 to T172 of FIG. 6

(Case F)
Same as T110 to T148 of FIG. 5 and T150 to T166 of FIG. 6
(T568) Authentication Device 50A Detached from Printer 10 During Printing
(T570) Continue Printing
(T572) Logout Request
(T574) Shift to Logout State
(T580) Print Completion Notification (Job ID "job1")
(T582) Delete Job ID "job1" and Print Data PD1
(T584) Delete Job ID "job1" and Print Data PD1

(Case G)

(Continuation of FIG. 8)

FIG. 10 (Case H)

(Continuation of FIG. 10)

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD EXECUTED BY COMMUNICATION DEVICE FOR AUTHENTICATION

REFERENCE TO RELATED APPLICATION

This application claims priority to Japanese Patent Application No. 2023-103458 filed on Jun. 23, 2023. The entire content of the priority application is incorporated herein by reference.

BACKGROUND ART

A system including an MFP, a portable terminal, and a print system is known. The portable terminal executes a biometric authentication process when receiving an authentication request from the MFP. When the biometric authentication succeeds, the portable terminal sends the MFP assertion information including authentication information ID and a signature encrypted by a private key corresponding to biometric authentication information of a user. The MFP sends the assertion information to the print system. The print system decrypts the assertion information by using a public key corresponding to the authentication information ID to check the validity of the assertion information.

SUMMARY

The disclosure herein discloses a communication device configured to operate according to a predetermined authentication scheme using a pair of keys. The communication device may comprise: a display unit; and a controller configured to: under a specific state where a plurality of user identification information and a plurality of key information corresponding to the plurality of user identification information are stored in association with one biometric authentication information in a first memory, acquire two or more user names corresponding to two or more user identification information among the plurality of user identification information; display, on the display unit, a first selection screen for selecting one user name from the acquired two or more user names; in response to sending an authentication request to a server, receive verification information from the server; in a case where authentication for a target user using the one biometric authentication information succeeds, a specific user name is selected on the first selection screen and the verification information is received from the server, acquire signature information created by encrypting the verification information by using a specific private key, the specific private key being a key corresponding to specific key information stored in association with specific user identification information corresponding to the selected specific user name in the first memory; and send the specific user identification information and the created signature information to the server, wherein the server is configured to decrypt the signature information by using a specific public key stored in association with the specific user identification information in the server.

According to the configuration above, the communication device displays the first selection screen for selecting one user name from the two or more user names. The target user can thus select the specific user name corresponding to the specific user identification information which is stored in association with the specific key information to be used for authentication. Therefore, authentication can be executed using the specific key information corresponding to the specific user name selected by the user.

A computer program for the above communication device, a non-transitory computer-readable medium storing the computer program, and a method performed by the communication device are also novel and useful. Further, a system comprising the communication device and a server is also novel and useful.

BRIEF DESCRIPTION OF DRAWINGS

FIG. 2 shows examples of respective tables.
FIG. 3 shows a sequence diagram for Case A in which a print file is uploaded to a server.
FIG. 7 shows sequence diagrams for Cases D and E in which printing fails and a sequence diagram for Case F in which an authentication device is detached during printing.

DESCRIPTION

Figure 1:
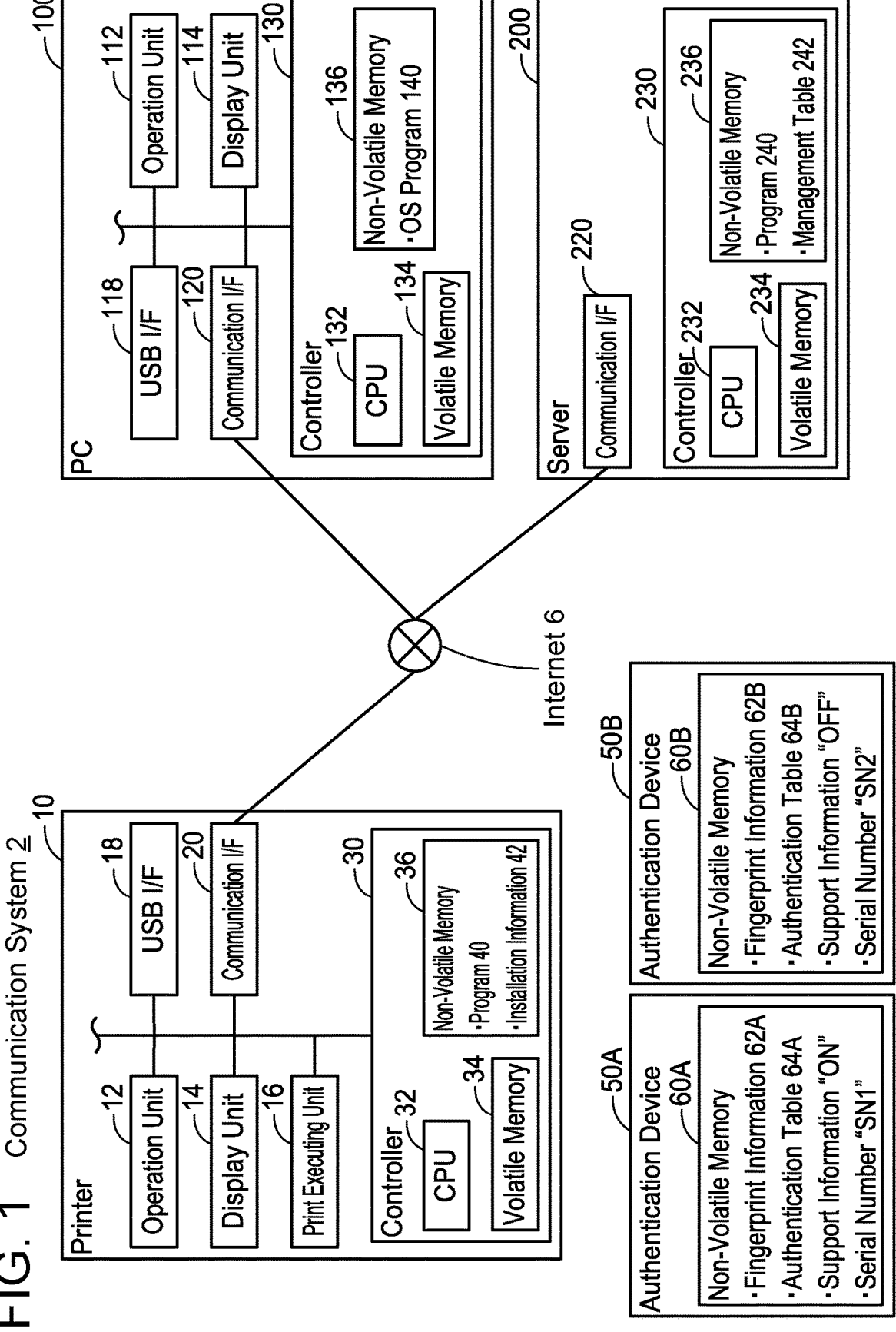
FIG. 1 shows a configuration of a communication system.

EMBODIMENTS (Configuration of Communication System 2; FIG. 1)
As shown in FIG. 1, a communication system 2 comprises a printer 10, authentication devices 50A, 50B, a PC 100, and a server 200. The printer 10, the PC 100, and the server 200 are connected to the internet 6. The printer 10, the PC 100, and the server 200 can communicate with each other via the internet 6.
(Configuration of Printer 10)
The printer 10 is a peripheral device (e.g., a peripheral device of the PC 100) configured to execute a print function. In a modification, the printer 10 may be a multifunctional device configured to execute a scan function, a FAX function, etc., in addition to a print function. The printer 10 is configured to operate according to a Fast Identity Online (FIDO) authentication scheme using a pair of keys. The FIDO authentication scheme uses a pair of keys, i.e., a private key and a public key. Further, the FIDO authentication scheme executes user authentication by using biometric authentication (e.g., fingerprint authentication, voice authentication, face authentication) instead of authentication using a password. Hereinafter, authentication according to the FIDO authentication scheme is termed "FIDO authentication".
The printer 10 comprises an operation unit 12, a display unit 14, a print executing unit 16, a USB interface 18, a communication interface 20, and a controller 30. Hereinafter, interface may be abbreviated as "I/F".
The operation unit 12 is an interface for input of various information into the printer 10 and comprises buttons, a touch panel, etc. The display unit 14 is a display or a panel for displaying various information. The panel may or may not be a touch panel. The panel is for example a liquid crystal panel or an organic EL panel. The print executing unit 16 comprises a printer engine of electrophotographic scheme, inkjet scheme, or thermal scheme. The USB I/F 18 is configured to allow a USB connector to be connected thereto. The communication I/F 20 is for communication with another device. The communication I/F 20 is connected to the internet 6. The communication I/F 20 may be a wired I/F or a wireless I/F.

The controller 30 comprises a CPU 32, a volatile memory 34, and a non-volatile memory 36. The volatile memory 34 comprises a RAM. The non-volatile memory 36 comprises a hard disk drive (HDD) and a ROM. The non-volatile memory 36 may comprise a solid state drive (SSD) or a flash memory. The non-volatile memory 36 stores a program 40 and installation information 42. Various processes are executed by the program 40 stored in the non-volatile memory 36 being loaded onto the volatile memory 34 and executed. The installation information 42 indicates the location in which the printer 10 is installed. As the installation information 42, one of the following information is stored: "PUBLIC" indicating that the printer 10 is installed in a place available to a large number of unspecified people such as a convenience store; "OFFICE" indicating that the printer 10 is installed in a place available to a large number of specified people such as an office; and "HOME" indicating that the printer 10 is installed in a private home. The installation information 42 can be set by an administrator of the printer 10.

(Configurations of Authentication Devices 50A, 50B)

The authentication devices 50A, 50B are configured to operate according to the FIDO authentication scheme. The authentication devices 50A, 50B operate as so-called authentication devices according to the FIDO authentication scheme. The authentication device 50A comprises a USB cable with a USB connector (not shown) and a non-volatile memory 60A. The non-volatile memory 60A stores fingerprint information 62A, an authentication table 64A, support information, and a serial number "SN1" of the authentication device 50A. The authentication table 64A is stored in association with the fingerprint information 62A. The fingerprint information 62A is related to fingerprints of a user who uses the PC 100. Hereinafter, the user of the PC 100 may be termed "target user". The support information indicates whether the authentication device supports user nameless authentication or not. The user nameless authentication does not require input of a user name for a login to a server that provides services. The authentication device 50A supports the user nameless authentication. Therefore, "ON", which indicates that the authentication device 50A supports the user nameless authentication, is stored as the support information in the non-volatile memory 60A.

The authentication device 50B comprises a USB cable with a USB connector (not shown) and a non-volatile memory 60B. The non-volatile memory 60B stores fingerprint information 62B, an authentication table 64B, support information, and a serial number "SN2" of the authentication device 50B. The authentication table 64B is stored in association with the fingerprint information 62B. The fingerprint information 62B is related to the fingerprints of the target user. The authentication device 50B does not support the user nameless authentication. Therefore, "OFF", which indicates that the authentication device 50B does not support the user nameless authentication, is stored as the support information in the non-volatile memory 60B.

4

(Configuration of PC 100)

The PC 100 may be a desktop PC or a laptop PC. The PC 100 is configured to operate according to the FIDO authentication scheme. The PC 100 comprises an operation unit 112, a display unit 114, a USB I/F 118, a communication I/F 120, and a controller 130.

The operation unit 112 is an interface for input of various information to the PC 100 and comprises a mouse, a keyboard, etc. The display unit 114 is a display or a panel for displaying various information. The USB I/F 118 is configured to allow a USB connector to be connected thereto. The communication I/F 120 is for communication with another device. The communication I/F 120 is connected to the internet 6. The communication I/F 120 may be a wired I/F or a wireless I/F.

The controller 130 comprises a CPU 132, a volatile memory 134, and a non-volatile memory 136. The non-volatile memory 136 stores an operating system (OS) program 140. The OS program 140 controls basic operations of the PC 100. Various processes are executed by the OS program 140 stored in the non-volatile memory 136 being loaded onto the volatile memory 134 and executed.

(Configuration of Server 200)

The server 200 is installed on the internet 6 and for example is provided by the vendor of the printer 10. In a modification, the server 200 may be installed on the internet 6 by a business operator different from the vendor. In another modification, the vendor may use an environment provided by an external cloud computing service, without preparing hardware of the server 200 on its own. In this case, the vendor may implement the server 200 by preparing a program (software) for the server 200 and introducing it to the above environment.

The server 200 is configured to operate according to the FIDO authentication scheme. The server 200 operates as a so-called authentication server according to the FIDO authentication scheme and also operates as a so-called mediation server that mediates printing performed by the printer 10. That is, the server 200 provides a service of mediating printing performed by the printer 10. The server 200 permits upload of print data to the server 200 and download of print data stored in the server 200, in response to success of user authentication according to the FIDO authentication scheme.

The server 200 comprises a communication I/F 220 and a controller 230. The communication I/F 220 is connected to the internet 6. The controller 230 comprises a CPU 232, a volatile memory 234, and a non-volatile memory 236. The non-volatile memory 236 stores a program 240 and a management table 242. Various processes are executed by the program 240 stored in the non-volatile memory 236 being loaded onto the volatile memory 234 and executed.

(Tables; FIG. 2)

Referring to FIG. 2, the authentication table 64A in the authentication device 50A, the authentication table 64B in the authentication device 50B, and the management table 242 in the server 200 are described.

In the authentication table 64A in the authentication device 50A which supports the user nameless authentication, RPIDs, key IDs, user IDs, private keys, and user names are stored in associated with each other. Each information in the authentication table 64A is registered when a registration process for registering a pair of keys to be used in FIDO authentication is executed. The RPIDs are IDs for identifying servers. In the present embodiment, the RPIDs are URLs. The key IDs are information for managing keys to be used in FIDO authentication. The user IDs are information for managing users and are created by the server 200. The private keys are information used when FIDO authentication is executed. The key IDs and the private keys are created by the authentication device in the registration process. Specifically, the authentication device creates a pair of keys (i.e., a private key and a public key) using a RPID and a key ID. The key IDs and the private keys in the authentication table 64A are created by the authentication device 50A. The user names are information set by users to log into the server 200. The user names are so-called login names.

In the authentication table 64B in the authentication device 50B which does not support the user nameless authentication, RPIDs, key IDs and user IDs are stored in association with each other. The information stored in the authentication table 64B is the same as the information stored in the authentication table 64A, except that the former does not include private keys and user names. The key IDs in the authentication table 64B are created by the authentication device 50B.

In the management table 242 in the server 200, RPIDs, key IDs, user IDs, public keys, user names, job IDs, and serial numbers are stored in association with each other. The RPIDs, key IDs, user IDs, public keys, and user names in the management table 242 are registered when the registration process is executed. The public keys are information used when FIDO authentication is executed. The public keys are created by the authentication device in the registration process. The job IDs and the serial numbers are registered when an upload process for uploading print data onto the server 200 is executed. The job IDs are information for identifying print data. The job IDs are associated with print data and these print data are stored in the non-volatile memory 236, although this is not shown.

(Specific Cases A to H)

Referring to FIGS. 3 to 11, specific Cases A to H implemented by the communication system 2 according to the present embodiment are described. In Cases A to F shown in FIGS. 3 to 7, the authentication device 50A which supports the user nameless authentication is used, while in Cases G and H shown in FIGS. 8 to 11, the authentication device 50B which does not support the user nameless authentication is used. Hereinafter, description is made with the devices (e.g., the printer 10) as the subjects of actions, not with the CPUs (e.g., the CPU 32 of the printer 10) as the subjects of actions. Communication between the printer 10, the PC 100, and the server 200 are executed via the communication I/Fs of the respective devices (e.g., the communication I/F 20 of the printer 10). Therefore, for descriptions about actions involving communication via the communication I/Fs, a phrase "via the communication I/F" is omitted. Further, communication between the printer 10 and the authentication devices 50A, 50B are executed via USB I/F of the device (e.g., the USB I/F 18 of the printer 10). Therefore, for descriptions about actions involving communications via the USB I/F, a phrase "via the USB I/F" is omitted.

Figure 4:
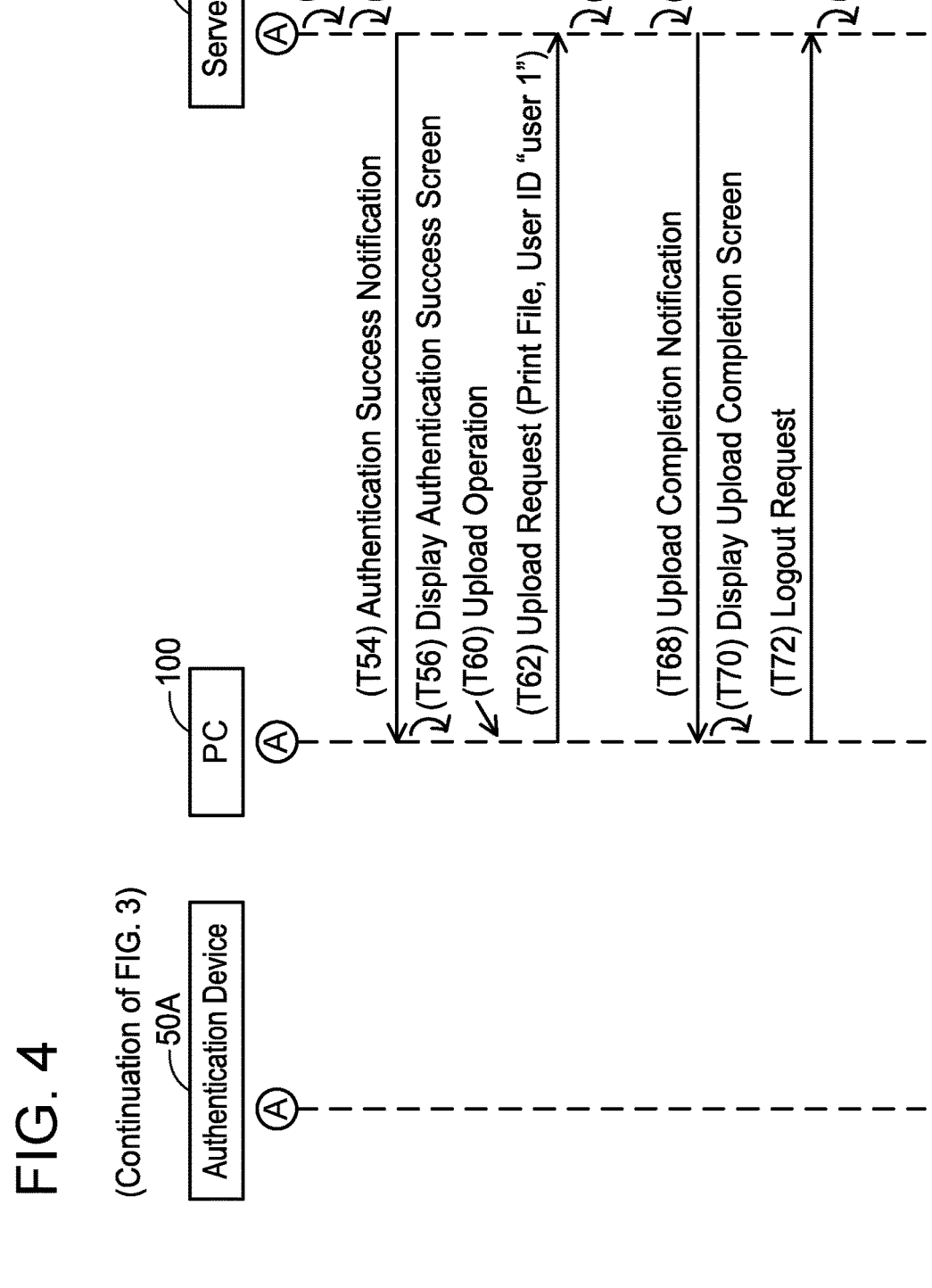
FIG. 4 shows a sequence diagram continued from FIG. 3.

(Case A; FIGS. 3 to 4)

Referring to FIGS. 3 to 4, Case A is described. In Case A, print data is uploaded to the server 200 in response to success of user authentication according to FIDO authentication. In the initial state of Case A, an RPID "URL1", a key ID "KEYID1", a user ID "user1", a private key PRK1, and a user name "aaa_company" are stored in association with each other, and the RPID "URL1", a key ID "KEYID2", a user ID "user2", a private key PRK2, and a user name "aaa_home" are also stored in association with each other in the authentication table 64A in the authentication device 50A. The URL1 is the URL of the server 200. That is, in the non-volatile memory 60A of the authentication device 50A, two user IDs and two key IDs corresponding to the two user IDs are stored in association with the one fingerprint information 62A of the target user. Further, the RPID "URL1", the key ID "KEYID1", the user ID "user1", a public key PUK1, and the user name "aaa_company" are stored in association with each other, and the RPID "URL1", the key ID "KEYID2", the user ID "user2", a public key PUK2, and the user ID "aaa_home" are also stored in association with each other in the management table 242 in the server 200. The user names "aaa_company" and the user name "aaa_home" are user names used by the target user. The user name "aaa_company" is used by the target user for work and is for example used to log into the server 200 in target user's place of work. The user name "aaa_home" is used by the target user for private purposes and is for example used to log into the server 200 in target user's home.

In T10, the user connects the USB connector of the authentication device 50A to the USB I/F 118 of the PC 100. The PC 100 then determines that the authentication device 50A has been connected to the PC 100 and sends a support information request to the authentication device 50A in T12. The support information request is a signal that requests the authentication device to send the support information. The PC 100 receives the support information "ON" from the authentication device 50A in T14. Since the received support information indicates "ON", the PC 100 determines that the connected authentication device 50A supports the user nameless authentication.

In T20, the target user performs a login operation without inputting a user name. Specifically, in the state where a login screen is displayed on the display unit 114 of the PC 100, the target user selects a login button in the login screen without inputting a user name. As a result, the PC 100 sends the server 200 an authentication request including the RPID "URL1" which identifies a service to be used by the target user (i.e., mediation service) in T22. When receiving the authentication request from the PC 100 in T22, the server 200 creates a one-time password OP1 and stores the one-time password OP1 in the volatile memory 234 in T24. The server 200 sends the PC 100 an authentication instruction including the RPID "URL1" and the one-time password OP1 in T26. The authentication instruction is a signal that instructs execution of biometric authentication and creation of signature information.

When receiving the authentication instruction from the server 200 in T26, the PC 100 displays a fingerprint authentication screen in T28. A message that requests fingerprint authentication to be executed using the authentication device 50A is displayed in the fingerprint authentication screen.

In T30, the target user performs a fingerprint authentication operation to the authentication device 50A. Fingerprint information acquired through the fingerprint authentication operation matches the fingerprint information 62A in the non-volatile memory 60A, and the authentication device 50A thus determines that fingerprint authentication succeeds and sends the PC 100 authentication success information indicating that the fingerprint authentication has succeeded in T32.

When receiving the authentication success information from the authentication device 50A in T32, the PC 100 sends a user name request including the RPID "URL1" to the authentication device 50A in T34. The user name request is a signal that requests sending of one or more user names stored in the authentication table 64A in association with the RPID included in the user name request.

When receiving the user name request from the PC 100 in T34, the authentication device 50A specifies the RPID "URL1" in the request and specifies two user names "aaa_company" and "aaa_home" stored in the authentication table 64A in association with the specified RPID "URL1". The authentication device 50A sends the specified user names "aaa_company" and "aaa_home" to the PC 100 in T36.

When receiving the user names "aaa_company" and "aaa_home" from the authentication device 50A in T36, the PC 100 displays a user name selection screen including the user names "aaa_company" and "aaa_home" in T38. The user name selection screen is a screen for the target user to select one user name. The target user selects the user name "aaa_company" in the user name selection screen in T40. As a result, in T42, the PC 100 sends the authentication device 50A a signature information creation request including the selected user name "aaa_company" and the received one-time password OP1 (see T26). The signature information creation request is a signal that requests creation of signature information. If the PC 100 receives only one user name from the authentication device 50A, the PC 100 may send a signature information creation request including this user name and the one-time password OP1 to the authentication device 50A without displaying the user name selection screen.

When receiving the signature information creation request from the PC 100 in T42, the authentication device 50A specifies the private key PRK1 stored in the authentication table 64A in association with the user name "aaa_company", which is included in the request. The authentication device 50A creates signature information SI1 in T44 by encrypting the received one-time password OP1 with the specified private key PRK1. The authentication device 50A specifies the user ID "user1" stored in the authentication table 64A in association with the received user name "aaa_company". The authentication device 50A sends the specified user ID "user1" and the created signature information SI1 to the PC 100 in T46.

When receiving the user ID "user1" and the signature information SI1 from the authentication device 50A in T46, the PC 100 sends an authentication response including the user ID "user1" and the signature information Si1 to the server 200 in T48.

When receiving the authentication response from the PC 100 in T48, the server 200 specifies the public key PUK1 stored in the management table 242 in association with the user ID "user1" included in the response. In T50 of FIG. 4, the server 200 decrypts the signature information SI1 included in the authentication response by using the specified public key PUK1. Since the private key PRK1 and the public key PUK1 are paired, the one-time password OP1 is acquired by decrypting the signature information SI1 with the public key PUK1. The server 200 determines that the acquired one-time password OP1 matches the one-time password OP1 stored in the volatile memory 234 (see T24 in FIG. 3) and determines that user authentication for the user ID "user1" (i.e., the user name "aaa_company") has succeeded. In this case, the server 200 shifts from a logout state to a login state in T52. By the server 200 shifting to the login state, the target user can upload a print file to the server 200. In T54, the server 200 sends the PC 100 an authentication success notification indicating that the user authentication has succeeded.

When receiving the authentication success notification from the server 200 in T54, the PC 100 displays an authentication success screen in T56. Thus, the target user is able to know that the user authentication has succeeded. In T60, the target user performs an upload operation on the PC 100 to upload a print file (specifically, print data) to the server 200. In the upload operation, the target user selects a print file to be sent. In T62, the PC 100 sends the server 200 an upload request including the print file selected by the target user and the user ID "user1".

When receiving the upload request from the PC 100 in T62, the server 200 creates a job ID "job1" as well as print data PD1 that represents a print image having a data format the printer 10 can interpret by converting the print file in the request in T64. The server 200 stores the created job ID "job1" in the management table 242 in association with the received user ID "user1" in T66. The server 200 stores the print data PD1 in the non-volatile memory 236 in association with the job ID "job1". In T68, the server 200 sends the PC 100 an upload completion notification indicating that the upload of the print file to the server 200 has been completed.

When receiving the upload completion notification from the server 200 in T68, the PC 100 displays an upload completion screen in T70. Thus, the target user is able to know that the upload of the print file to the server 200 has been completed. The PC 100 sends a logout request to the server 200 in T72.

When receiving the logout request from the PC 100 in T72, the server 200 shifts from the login state to the logout state in T74. As above, the print file is uploaded to the server 200 in response to the success of user authentication according to the FIDO authentication scheme.

Figure 5:
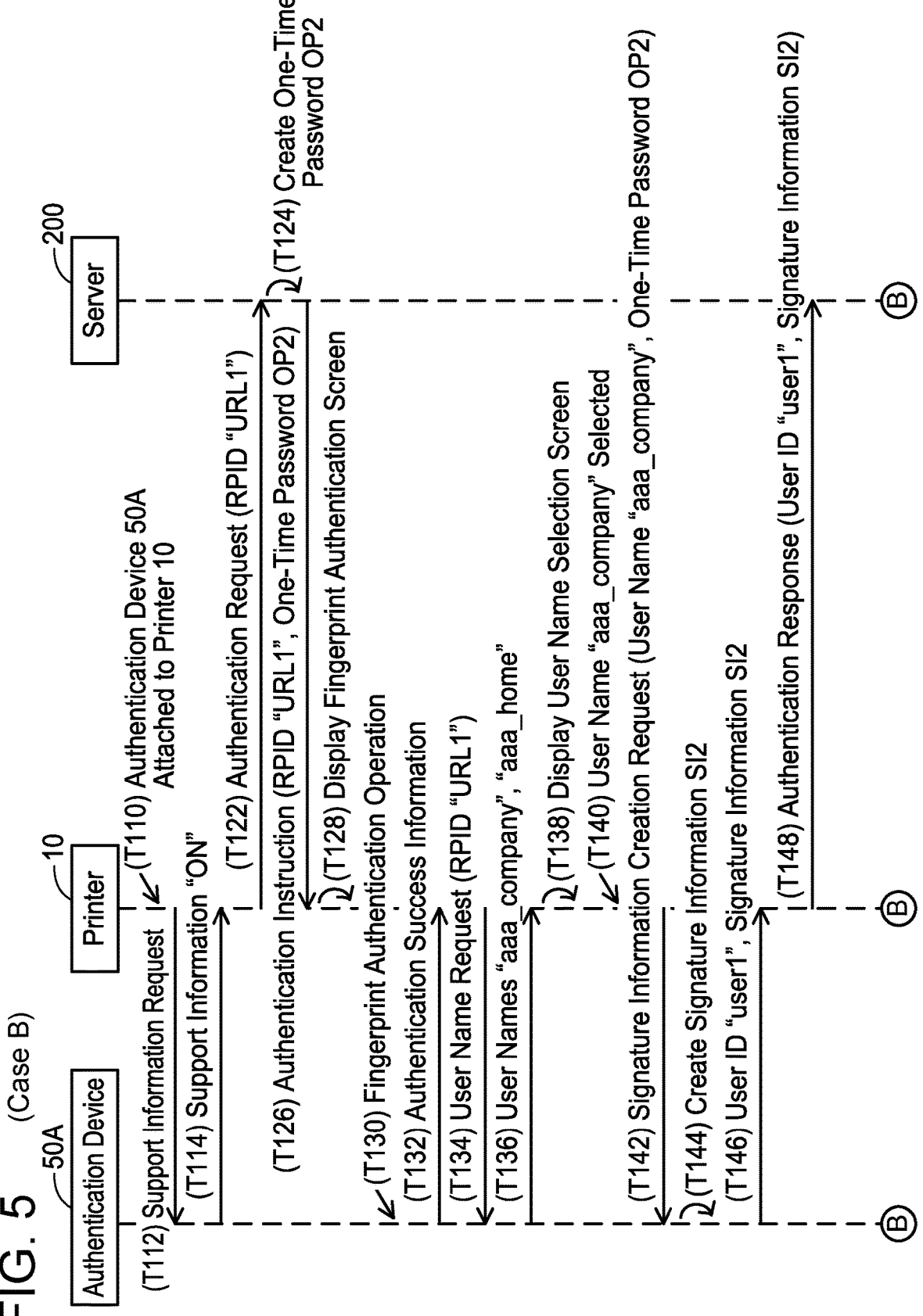
FIG. 5 shows a sequence diagram for Case B in which print data is downloaded from the server.
Figure 6:
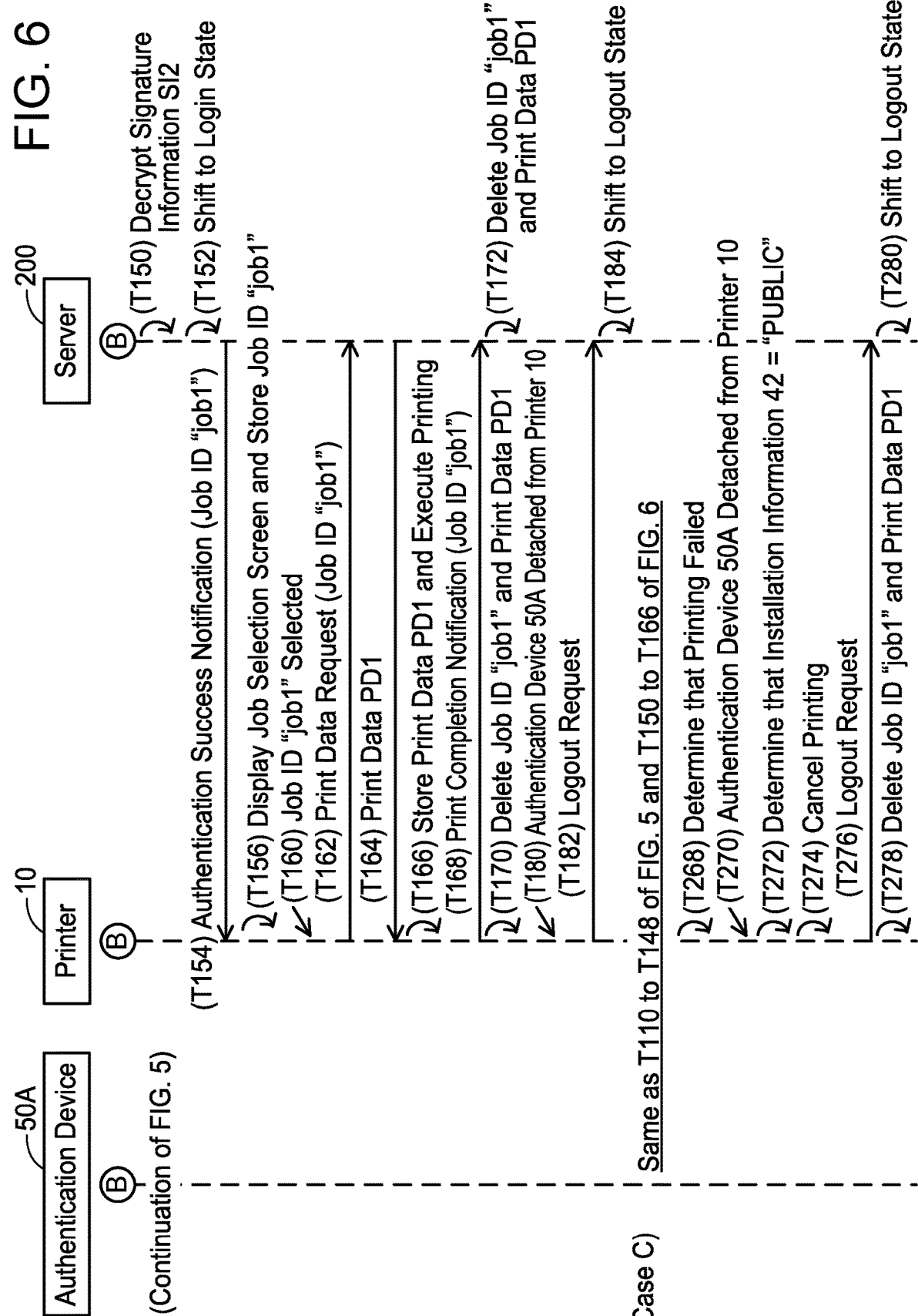
FIG. 6 shows a sequence diagram continued from FIG. 5 and a sequence diagram for Case C in which printing fails.

(Case B; FIGS. 5, 6)

Referring to FIGS. 5 and 6, Case B is described. In Case B, print data is downloaded from the server 200 in response to success of user authentication according to the FIDO authentication scheme. The initial state of Case B is the state after Case A. That is, in the non-volatile memory 60A in the authentication device 50A, two user IDs and two key IDs corresponding to the two user IDs are stored in association with the one fingerprint information 62A of the target user.

In T110, the target user connects the USB connector of the authentication device 50A to the USB I/F 18 of the printer 10. The printer 10 then determines that the authentication device 50A has been connected to the printer 10, sends a support information request to the authentication device 50A in T112, and receives support information "ON" from the authentication device 50A in T114. Since the received support information indicates "ON", the printer 10 determines that the connected authentication device 50A supports the user nameless authentication. In this case, the printer 10 sends the server 200 an authentication request including the RPID "URL1" stored in advance in the non-volatile memory 36 in T122.

When receiving the authentication request from the printer 10 in T122, the server 200 creates a one-time password OP2 and stores it in the volatile memory 234 in T124. The server 200 sends the printer 10 an authentication instruction including the RPID "URL1" and the one-time password OP2 in T126.

T126 to T148 are the same as T26 to T48 in FIG. 3, except that the communication counterpart is the printer 10 and that the one-time password OP2 is used. In T144 of the present case, the authentication device 50A creates signature information SI2 by encrypting the received one-time password OP2 with the private key PRK1. In T150 of FIG. 6, the server 200 acquires the one-time password OP2 by decrypting the signature information SI2 with the public key PUK1. The server 200 determines that the decrypted one-time password OP2 matches the one-time password OP2 stored in the volatile memory 234 and thus determines that the user authentication for the user ID "user1" has succeeded. The server 200 shifts from the logout state to the login state in T152. By the server 200 shifting to the login state, the target user can download print data uploaded to the server 200. The server 200 specifies the job ID "job1" stored in the management table 242 in association with the authenticated user ID "user1" and sends the printer 10 an authentication success notification including the specified job ID "job1" in T154.

When receiving the authentication success notification from the server 200 in T154, the printer 10 displays a job selection screen including the received job ID "job1" and stores the received job ID "job1" in the volatile memory 34 in T156. The job selection screen is for the target user to select one job ID. The target user selects the job ID "job1" in the job selection screen in T160. The printer 10 then sends the server 200 a print data request including the selected job ID "job1" in T162.

When receiving the print data request from the printer 10 in T162, the server 200 specifies print data PD1 stored in the non-volatile memory 236 in association with the job ID "job1" included in the request, and sends the specified print data PD1 to the printer 10 in T164.

When receiving the print data PD1 from the server 200 in T164, the printer 10 stores the print data PD1 in the non-volatile memory 36 in association with the job ID "job1" and executes printing using the print data PD1 in T166. In the present case, the printing using the print data PD1 is completed without error. In this case, the printer 10 sends the server 200 a print completion notification including the job ID "job1" in T168, and deletes the job ID "job1" and the print data PD1 from the volatile memory 34 in T170.

When receiving the print completion notification from the printer 10 in T168, the server 200 deletes the job ID "job1" from the management table 242 and deletes the print data PD1 from the non-volatile memory 236 in T172.

Thereafter, the target user detaches the authentication device 50A from the printer 10 in T180. The printer 10 thus determines that a logout operation for logout from the server 200 has been accepted and sends a logout request to the server 200 in T182.

When receiving the logout request from the printer 10 in T182, the server 200 shifts from the login state to the logout state in T184. As above, the printing using FIDO authentication is executed.

(Case C; FIG. 6)

Referring to FIG. 6, Case C is described. In Case C, in the state where "PUBLIC" is stored as the installation information 42 in the printer 10, printing using the print data PD1 fails due to occurrence of an error in the printer 10. The error is for example lack of print paper. The initial state of Case C is the same as the initial state of Case B in FIGS. 5 and 6.

First, the sequences same as T110 to T148 in FIGS. 5 and T150 to T166 in FIG. 6 are executed between the authentication device 50A, the printer 10, and the server 200. In T268, the printer 10 determines that the printing has failed. The target user detaches the authentication device 50A from the printer 10 in T270. The printer 10 then determines that the logout operation for logout from the server 200 has been accepted. Further, the printer 10 determines that the installation information 42 indicates "PUBLIC" in T272. In this case, the printer 10 executes a first logout process. Specifically, the printer 10 cancels the printing in T274, sends a logout request to the server 200 in T276, and deletes the job ID "job1" and the print data PD1 from the non-volatile memory 36 in T278. T280 is the same as T184. Thereafter, when the error in the printer 10 is fixed by the target user replenishing the printer 10 with print paper and the authentication device 50A is connected to the printer 10, the sequence from T112 in FIG. 5 onward is executed again.

(Case D; FIG. 7)

Referring to FIG. 7, Case D is described. In Case D, in the state where "OFFICE" is stored as the installation information 42 in the printer 10, printing using the print data PD1 fails due to occurrence of an error in the printer 10. The initial state of Case D is the same as the initial state of Case B in FIGS. 5, 6.

First, the sequences same as T110 to T148 in FIGS. 5 and T150 to T166, T268, and T270 in FIG. 6 are executed between the authentication device 50A, the printer 10, and the server 200. In T372, the printer 10 determines that the installation information 42 indicates "OFFICE". In this case, the printer 10 executes a second logout process. Specifically, the printer 10 cancels the printing in T374 and sends a logout request to the server 200 in T376. That is, the printer 10 does not delete the job ID "job1" and the print data PD1 from the volatile memory 34. T378 is the same as T184 in FIG. 6. Thereafter, when the error in the printer 10 is fixed and the authentication device 50A is connected to the printer 10, the sequence from T112 in FIG. 5 onward is executed. In this case, however, T156 to T164 in FIG. 6 are omitted since the job ID "job1" and the print data PD1 are still stored in the non-volatile memory 36. In a modification, only T162 and T164 in FIG. 6 may be omitted.

(Case E; FIG. 7)

Referring to FIG. 7, Case E is described. In Case E, in the state where "HOME" is stored as the installation information 42 in the printer 10, printing using the print data PD1 fails due to occurrence of an error in the printer 10. The initial state of Case E is the same as the initial state of Case B in FIGS. 5, 6.

First, the sequences same as T110 to T148 in FIGS. 5 and T150 to T166, T268, and T270 in FIG. 6 are executed between the authentication device 50A, the printer 10, and the server 200. In T472, the printer 10 determines that the installation information 42 indicates "HOME". In this case, the printer 10 executes a third logout process. Specifically, the printer 10 pauses the printing in T474. That is, the printer 10 does not cancel the printing. Further, the printer 10 sends a logout request to the server 200 in T476. T478 is the same as T184 in FIG. 6. Thereafter, when the target user replenishes the printer 10 with print paper, the printer 10 determines that the error has been fixed in T480 and resumes the printing using the print data PD1 in T482. Once the printing is completed, the sequence same as T168 to T172 in FIG. 6 is executed. In a modification, the printer 10 may send the logout request to the server 200 after the printing is completed, i.e., after T170 of FIG. 6 cited in Case E of FIG. 7, instead of in T476.

As shown in Cases C to E, the printer 10 is configured to execute one of the first logout process, the second logout process, and the third logout process when printing fails. According to this configuration, the printer 10 can execute an appropriate logout process among the first logout process, the second logout process, and the third logout process.

The printer 10 executes the first logout process if "PUBLIC" is stored as the installation information 42 (Case C in FIG. 6), executes the second logout process if "OFFICE" is stored as the installation information 42 (Case D in FIG. 7), and executes the third logout process if "HOME" is stored as the installation information 42 (Case E in FIG. 7). If "PUBLIC" is stored as the installation information 42, a user who will use the printer 10 after the target user is highly probably a third party who is not relevant with the target user. In this situation, it is undesirable in terms of security that the server 200 is maintained in the login state and the job ID "job1" remains in the printer 10 after the authentication device 50A has been detached from the printer 10. If "OFFICE" is stored as the installation information 42, a user who will use the printer 10 after the target user is highly probably a coworker of the target user. In this situation, even if the job ID "job1" remains in the printer 10, it is less problematic in terms of security. If "HOME" is stored as the installation information 42, a user who will use the printer 10 after the target user is highly probably the target user. In this situation, even if the printing resumes after the authentication device 50A has been detached from the printer 10, it is less problematic in terms of security. As above, the printer 10 can execute an appropriate logout process depending on the information indicated by the installation information 42.

(Case F; FIG. 7)

Referring to FIG. 7, Case F is described. In Case F, the authentication device 50A is detached from the printer 10 while the printing using the print data PD1 is ongoing. The initial state of Case F is the same as the initial state of Case B in FIG. 5, 6.

First, the sequences same as T110 to T148 in FIGS. 5 and T150 to T166 in FIG. 6 are executed between the authentication device 50A, the printer 10, and the server 200. The target user detaches the authentication device 50A from the printer 10 while the printing using the print data PD1 is ongoing in T568. In this case, the printer 10 determines that the logout operation for logout from the server 200 has been accepted but continues the printing using the print data PD1 in T570 and sends a logout request to the server 200 in T572. T574 is the same as T184 in FIG. 6. Once the printing is completed, the printer 10 sends a print completion notification including the job ID "job1" to the server 200 in T580 and deletes the job ID "job1" and the print data PD1 from the volatile memory 34 in T582. T584 is the same as T172 in FIG. 6. In a modification, the printer 10 may send the logout request to the server 200 after the printing has been completed, i.e., after T582, instead of in T572.

As described above, the printer 10 does not cancel the printing even when the authentication device 50A is detached from the printer 10 while the printing is ongoing. The target user may mistakenly think that the printing has been completed and detach the authentication device 50A from the printer 10 while the printer 10 is still executing the printing. According to the configuration above, the printer 10 does not cancel the printing, and thus the printing is completed appropriately even when the target user mistakenly detaches the authentication device 50A from the printer 10. Therefore, the convenience for the target user is improved.

Figure 8:
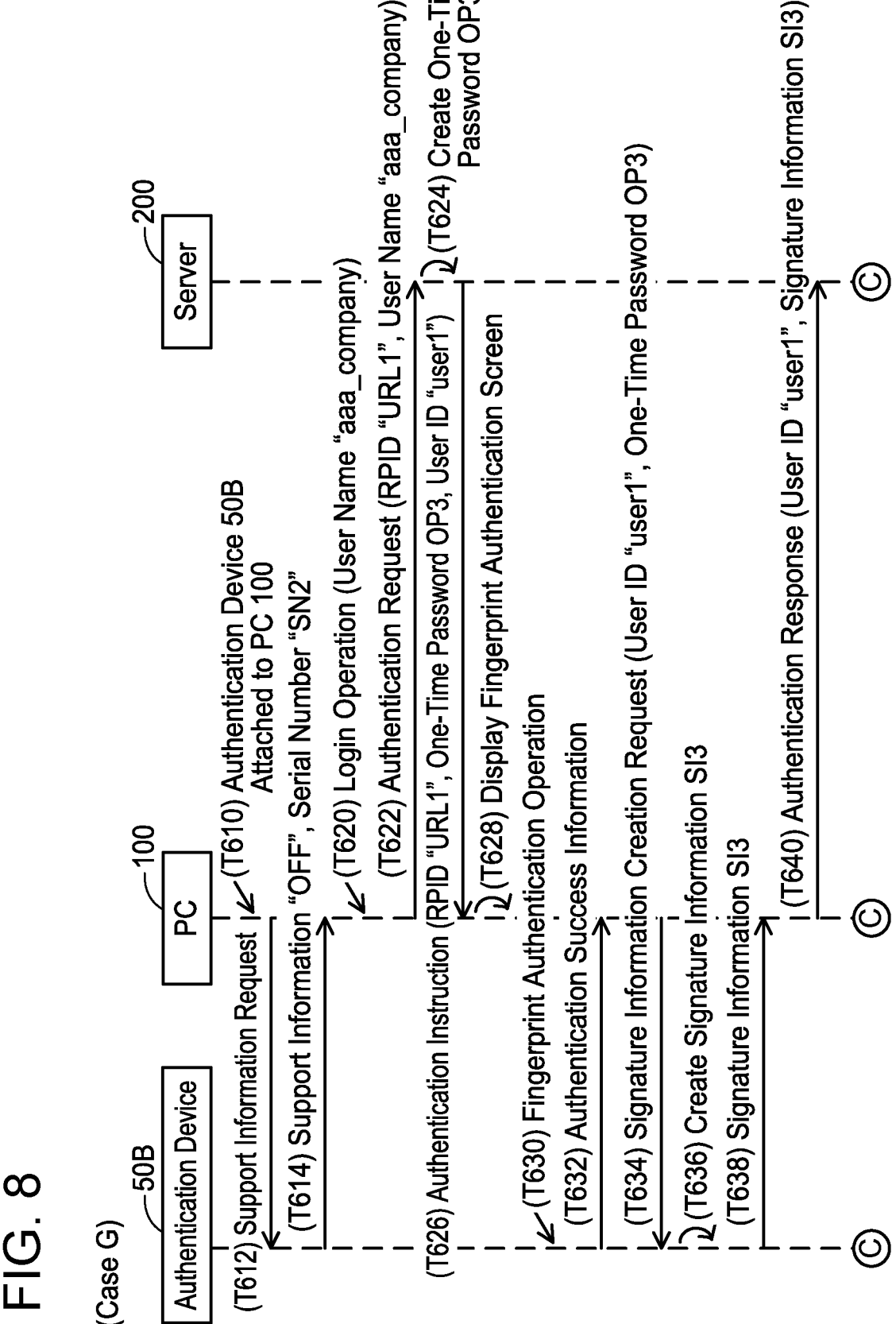
FIG. 8 shows a sequence diagram for Case G in which a print file is uploaded to the server.
Figure 9:
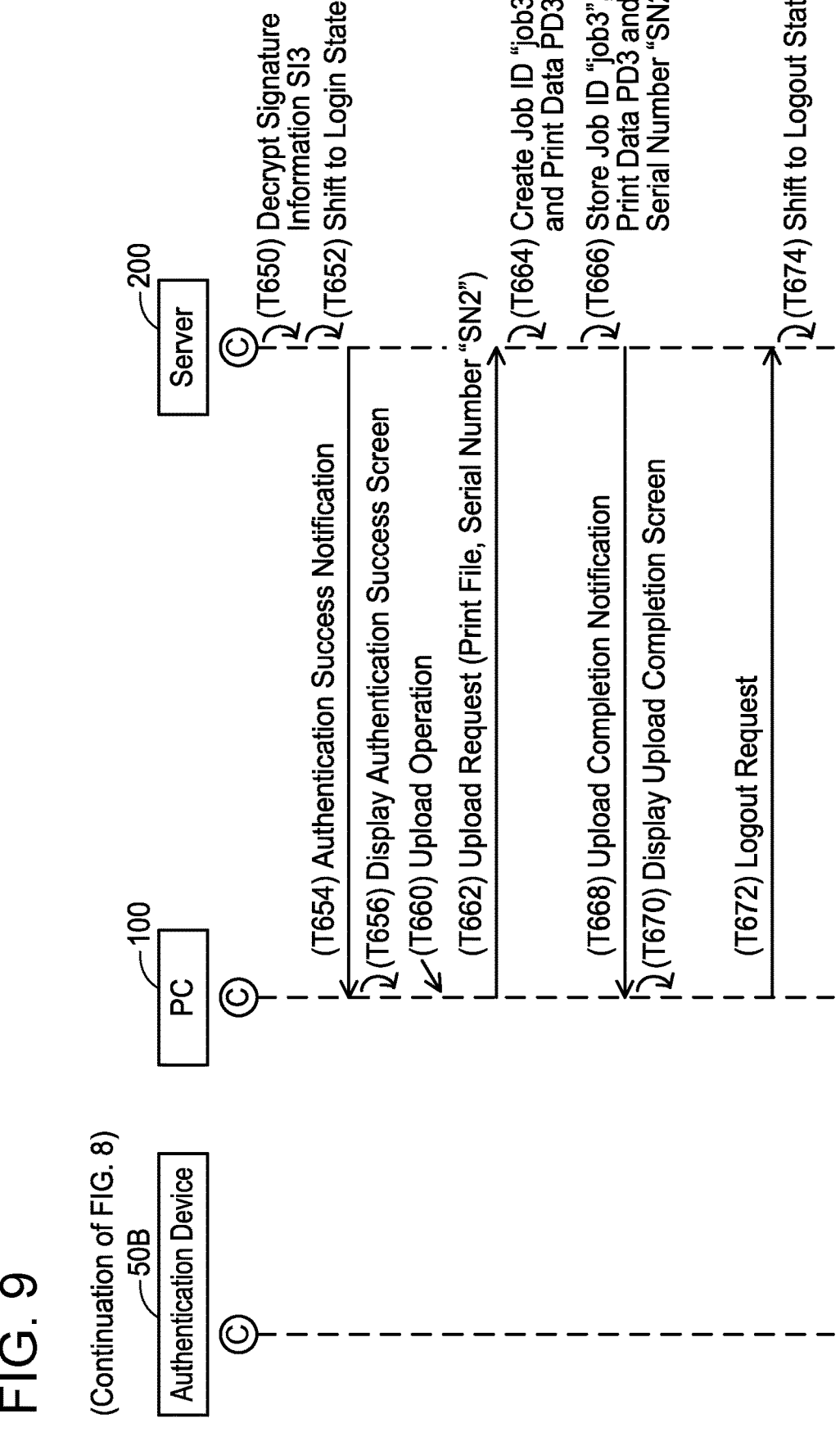
FIG. 9 shows a sequence diagram continued from FIG. 8.

(Case G; FIGS. 8 and 9)

Referring to FIGS. 8 and 9, Case G is described. In Case G, print data is uploaded to the server 200 in response to success of user authentication according to the FIDO authentication scheme. In the initial state of Case G, the RPID "URL1", the key ID "KEYID1", and the user ID "user1" are stored in association with each other, and the RPID "URL1", the key ID "KEYID2", and the user ID "user2" are also stored in association with each other in the authentication table 64B in the authentication device 50B. That is, two user IDs and two key IDs corresponding to the two user IDs are stored in association with the one fingerprint information 62B of the target user in the non-volatile memory 60B in the authentication device 50B. Further, the RPID "URL1", the key ID "KEYID1", the user ID "user1", the public key PUK1, and the user name "aaa_company" are stored in association with each other, and the RPID "URL", the key ID "KEYID2", the user ID "user2", the public key PUK2, the user name "aaa_home", a job ID "job2", and the serial number "SN2" are also stored in association with each other in the management table 242 in the server 200.

In T610, the target user connects the USB connector of the authentication device 50B to the USB I/F 118 of the PC 100. The PC 100 then determines that the authentication device 50B has been connected to the PC 10, sends a support information request to the authentication device 50B in T612, and receives support information "OFF" and the serial number "SN2" from the authentication device 50B in T614. Since the received support information indicates "OFF", the PC 100 determines that the connected authentication device 50B does not support the user nameless authentication.

The target user performs a login operation of inputting the user name "aaa_company" in T620. Specifically, the target user inputs the user name "aaa_company" while a login screen is displayed on the display unit 114 of the PC 100 and selects a login button in the login screen. The PC 100 then sends the RPID "URL" and the inputted user name "aaa_company" to the server 200 in T622.

When receiving the authentication request from the PC 100 in T622, the server 200 creates a one-time password OP3 in T624 and stores the one-time password OP3 in the volatile memory 234. The server 200 specifies the user ID "user1" stored in the management table 242 in association with the user name "aaa_company" included in the authentication request and sends the PC 100 an authentication instruction including the RPID "URL1", the one-time password OP3, and the user ID "user1" in T626. T628 is the same as T28 in FIG. 3.

The target user performs a fingerprint authentication operation on the authentication device 50B in T630. Since the fingerprint information acquired through the fingerprint authentication operation matches the fingerprint information 62B in the non-volatile memory 60B, the authentication device 50B determines that the fingerprint authentication has succeeded and sends authentication success information to the PC 100 in T632.

When receiving the authentication success information from the authentication device 50B in T632, the PC 100 sends the authentication device 50B a signature information creation request including the user ID "user1" and the one-time password OP3 in T634.

When receiving the signature information creation request from the PC 100 in T634, the authentication device 50B specifies the RPID "URL1" and the key ID "KEYID1" stored in the authentication table 64B in association with the user ID "user1" included in the request. The authentication device 50B creates a private key by using the specified RPID "URL1" and the key ID "KEYID1". The private key created in this case is a private key PRK1 corresponding to the public key PUK1 stored in the management table 242 in the server 200. The authentication device 50B creates signature information SI3 by encrypting the received one-time password OP3 with the created private key PRK1 in T636 and sends the created signature information SI3 to the PC 100 in T638.

When receiving the signature information SI3 from the authentication device 50B in T638, the PC 100 sends the server 200 an authentication response including the user ID "user1" and the signature information SI3 in T640.

When receiving the authentication response from the PC 100 in T640, the server 200 decrypts the signature information SI3 included in the authentication response by using the public key PUK1 to acquire the one-time password OP3 in T650 of FIG. 9. The server 200 determines that the acquired one-time password OP3 matches the one-time password OP3 stored in the volatile memory 234 and thus determines that the user authentication for the user ID "user1" has succeeded. T652 to T660 is the same as T52 to T60 in FIG. 4.

In T662, the PC 100 sends the server 200 an upload request including the print file selected by the target user and the received serial number "SN2" (see T614 in FIG. 8).

When receiving the upload request from the PC 100 in T662, the server 200 creates a job ID "job3" as well as print data PD3 in T664. In T666, the server 200 stores the created job ID "job3" and the received serial number "SN2" in association with the received user ID "user1" in the management table 242. The server 200 stores the print data PD3 in association with the job ID "job3" in the non-volatile memory 236. T668 to T674 is the same as T68 to T74 in FIG. 4. As above, the print file is uploaded to the server 200 in response to the success of the user authentication according to the FIDO authentication scheme.

Figure 10:
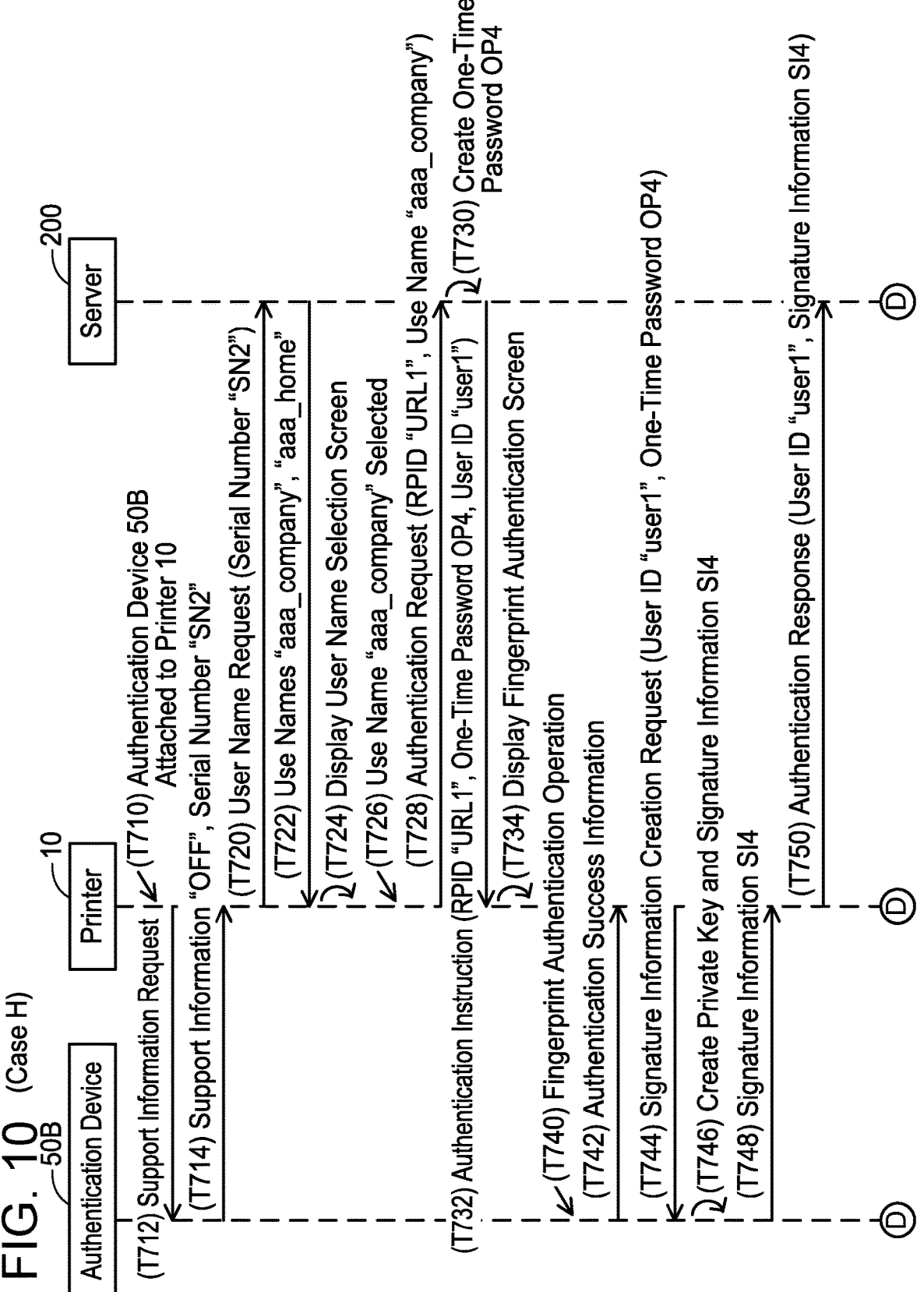
FIG. 10 shows a sequence diagram for Case H in which print data is downloaded from the server.
Figure 11:
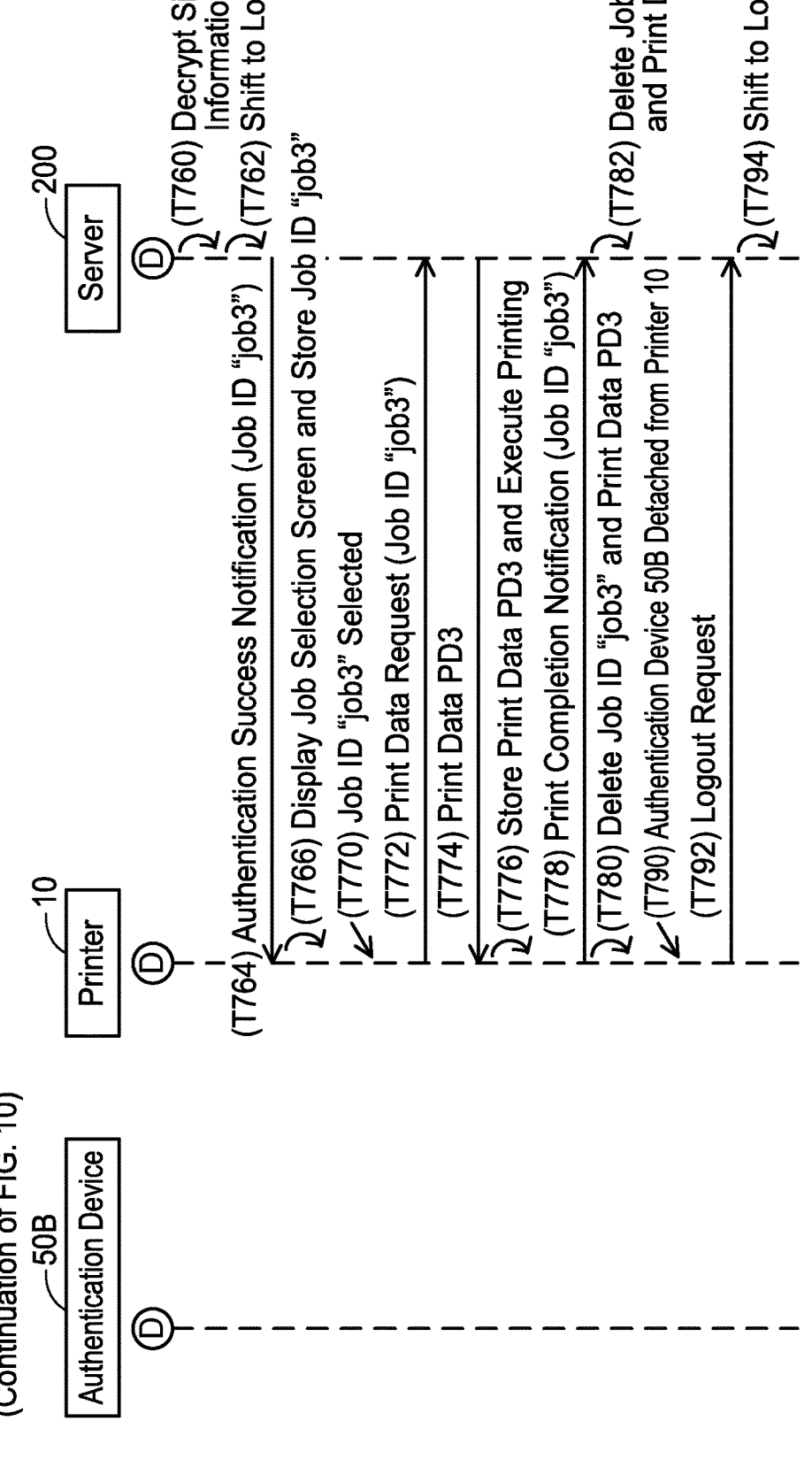
FIG. 11 shows a sequence diagram continued from FIG. 10.

(Case H; FIGS. 10, 11)

Referring to FIGS. 10, 11, Case H is described. In Case H, print data is downloaded from the server 200 in response to success of user authentication according to FIDO authentication. The initial state of Case H is the state after Case G. That is, the two user IDs and the two key IDs corresponding to the two user IDs are stored in association with the one fingerprint information 62B in the non-volatile memory 60B in the authentication device 50B. In T710, the target user connects the USB connector of the authentication device 50B to the USB I/F 18 of the printer 10. The printer 10 then determines that the authentication device 50B has been connected to the printer 10, sends a support information request to the authentication device 50B in T712, and receives support information "OFF" and the serial number "SN2" from the authentication device 50B in T714. Since the received support information indicates "OFF", the printer 10 determines that the connected authentication device 50B does not support the user nameless authentication. In this case, the printer 10 sends a user name request including the received serial number "SN2" to the server 200 in T720. The user name request is a signal for requesting the server 200 to send user name(s) stored in the management table 242 in association with the serial number "SN2" included in the user name request. As above, when an authentication device connected to the printer 10 does not support the user nameless authentication, the printer 10 sends a user name request to the server 200. On the other hand, when an authentication device connected to the printer 10 supports the user nameless authentication, the printer 10 sends a user name request to the authentication device (see T134 in FIG. 5).

When receiving the user name request from the printer 10 in T720, the server 200 specifies the user names "aaa_company", "aaa_home" stored in the management table 242 in association with the serial number "SN2" included in the request. In T722, the server 200 sends the user names "aaa_company", "aaa_home" to the printer 10.

When receiving the user names "aaa_company", "aaa_home" from the server 200 in T722, the printer 10 displays a user name selection screen including the user names "aaa_company", "aaa_home" in T724. In T726, the user selects the user name "aaa_company" in the user name selection screen. The printer 10 then sends the server 200 an authentication request including the RPID "URL1" and the selected user name "aaa_company" in T728. As described, the printer 10 sends the user name request including the serial number "SN2" to the server 200, and thus user name(s) stored in the management table 242 in association with a serial number different from the serial number "SN2" is suppressed to be sent to the printer 10. This reduces the number of user names displayed in the user name selection screen. Therefore, the convenience for the target user can be improved.

When receiving the authentication request from the printer 10 in T728, the server 200 creates one-time password OP4 in T730 and stores the one-time password OP4 in the volatile memory 234. T732, T734, and T740 to T744 are the same as T626, T628, and T640 to T644 in FIG. 8, respectively except that the communication counterpart is the printer 10 and the one-time password OP4 is used.

The authentication device 50B creates a private key by using the RPID "URL1" and the key ID "KEYID1" in the authentication table 64B and creates signature information SI4 by encrypting the received one-time password OP4 with the created private key in T746. T748, T750 and T760, T762 in FIG. 11 are the same as T638, T640 in FIGS. 8 and T650, T652 in FIG. 9, respectively except that the communication counterpart is the printer 10 and the one-time password OP4 is used.

T764 to T782 are the same as T154 to T172 in FIG. 6 except that the job ID "job3" and the print data PD3 are used.

The target user detaches the authentication device 50B from the printer 10 in T790. The printer 10 then determines that a logout operation for logout from the server 200 has been accepted and sends a logout request to the server 200 in T792. T794 is the same as T184 in FIG. 6. As above, printing using FIDO authentication is executed.

Advantageous Effects of Embodiment

According to the configuration above, the printer 10 displays the user name selection screen for selecting one user name from two or more user names (T138 in FIG. 5, T724 in FIG. 10). This allows the target user to select the user name "aaa_company" corresponding to the user ID "user1" stored in association with the key ID "KEY1" to be used for authentication (T140 in FIG. 5, T726 in FIG. 10). Thus, the authentication can be executed using the key ID "KEY1" corresponding to the user name "aaa_company" selected by the target user. Further, the operation by the target user can be simplified as compared to a configuration in which the target user needs to input a user name to the printer 10. Therefore, the convenience for the target user can be improved.

Further, when the authentication device 50A which supports the user nameless authentication is connected to the printer 10, the printer 10 receives the user names "aaa_company", "aaa_home" from the authentication device 50A (T136 in FIG. 5), while when the authentication device 50B which does not support the user nameless authentication is connected to the printer 10, the printer 10 receives the user names "aaa_company", "aaa_home" from the server 200 (T722 in FIG. 10). Thus, the printer 10 can execute an appropriate process depending on whether an authentication device supports the user nameless authentication or not.

In this embodiment, a job ID and print data are stored in association with each user name in the server 200. Therefore, for the target user to download desired print data from the server 200, FIDO authentication needs to be executed using the user name associated with that print data. According to the configuration above, the target user can select the user name associated with the print data the target user wishes to download. Therefore, the target user can have the printer 10 execute printing using the desired print data. The convenience for the target user can thus be improved.

(Correspondence Relationships)

The printer 10 is an example of "communication device". The fingerprint information is an example of "biometric authentication information". The user IDs are examples of "user identification information". The key IDs are examples of "key information". The non-volatile memory 60A in the authentication device 50A is an example of "first memory". The user name selection screen is an example of "first selection screen". The user name "aaa_company" is an example of "specific user name". The one-time password are examples of "verification information". The private ley PRK1 is an example of "specific private key". The user ID "user1" is an example of "specific user identification information". The public key PUK1 is an example of "specific public key". The USB I/F 18 is an example of "interface". The authentication device 50A which supports the user nameless authentication is an example of "first-type authentication device". The authentication device 50B which does not support the user nameless authentication is an example of "second-type authentication device". The support information are examples of "type information". The job IDs are examples of "print data identification information". The job selection screen is an example of "second selection screen". The job IDs "job1", "job3" are examples of "specific print data identification information". The print data PD1, PD3 are examples of "specific print data". The non-volatile memory 36 in the printer 10 is an example of "second memory". The installation information 42 is an example of "setting value". "PUBLIC" in the installation information 42 is an example of "first value". "OFFICE" in the installation information 42 is an example of "second value". "HOME" in the installation information 42 is an example of "third value".

T136 in FIGS. 5 and T722 in FIG. 10 are examples of "acquire two or more user names". T138 in FIGS. 5 and T724 in FIG. 10 are examples of "display, on the display unit, a first selection screen". T146 in FIGS. 5 and T748 in FIG. 10 are examples of "send the specific user identification information and the created signature information to the server".

(Modification 1) "Communication device" is not limited to a printer and may be a portable terminal such as a PC, a smartphone, etc.

(Modification 2) If a portable terminal is an example of the "communication device" and the portable terminal supports the user nameless authentication, the fingerprint information 62A and the information in the authentication table 64A may be stored in a memory of the portable terminal. If the portable terminal does not support the user nameless authentication, the fingerprint information 62B and the information in the authentication table 64B may be stored in the memory of the portable terminal. In this modification, the memory of the portable terminal is an example of "first memory". Further, in this modification, the user performs the fingerprint authentication operation to the portable terminal.

(Modification 3) "User identification information" is not limited to a user ID and may be a user name.

(Modification 4) The user name request in T720 of FIG. 10 may include the RPID "URL1" instead of the serial number of the authentication device. In this modification, the server 200 sends the printer 10 two or more user names stored in the management table 242 in association with the RPID "URL1".

(Modification 5) In the embodiment above, the printer 10 is configured to execute the process corresponding to the authentication device 50A which supports the user nameless authentication and the process corresponding to the authentication device 50B which does not support the user nameless authentication. Specifically, if an authentication device connected to the printer 10 supports the user nameless authentication, the printer 10 acquires user names from the authentication device, while if the authentication device connected to the printer 10 does not support the user nameless authentication, the printer 10 acquires user names from the server 200. In a modification, the printer 10 may be configured to execute only the process corresponding to the authentication device 50A which supports the user nameless authentication or execute only the process corresponding to the authentication device 50B which does not support the user nameless authentication.

(Modification 6) The printer 10 may be configured to execute only one or two of the first logout process, the second logout process, and the third logout process. In another modification, the printer 10 may be configured to send a logout request to the server 200 only when the authentication device 50A, 50B is detached from the printer 10.

(Modification 7) In Case C shown in FIG. 6, the printer 10 may execute the sequence from T272 onward without the authentication device 50A being detached from the printer 10 after the printing has failed. That is, the printer 10 may execute the first logout process without accepting the logout operation. In this modification, T270 may be omitted. In Case D shown in FIG. 7, the printer 10 may also execute the sequence from T372 onward without the authentication device 50A being detached from the printer 10 after the printing has failed. That is, the printer 10 may execute the second logout process without accepting the logout operation. In this modification, T370 may be omitted.

(Modification 8) The printer 10 may determine which of the first logout process, the second logout process, and the third logout process is to be executed depending on the usage history of the printer 10. For example, the printer 10 may switch the contents of logout process (es) to be executed depending on the number of authentication devices connected to the printer 10. In another modification, the printer 10 may determine which of the first logout process, the second logout process, and the third logout process is to be executed depending on the user operation performed after printing has failed.

(Modification 9) If the authentication device 50A, 50B is detached while printing is ongoing, the printer 10 may cancel the printing.

(Modification 10) In Case A shown in FIGS. 3, 4, T28 to T32 may be executed after T34 to T40 have been executed. In Case B shown in FIGS. 5, 6, T128 to T132 may be executed after T134 to T140 have been executed.

(Modification 11) In the embodiment above, the processes in FIGS. 3 to 11 are implemented by software (e.g., the programs 40, 140, 240), however, at least one of these processes may be implemented by hardware such as a logic circuit, etc.

What is claimed is:

1. A communication device configured to operate according to a predetermined authentication scheme using a pair of keys, the communication device comprising:

a display unit; and a controller configured to:

under a specific state where a plurality of user identification information and a plurality of key information corresponding to the plurality of user identification information are stored in association with one biometric authentication information in a first memory, acquire two or more user names corresponding to two or more user identification information among the plurality of user identification information;

display, on the display unit, a first selection screen for selecting one user name from the acquired two or more user names;

in response to sending an authentication request to a server, receive verification information from the server;

in a case where authentication for a target user using the one biometric authentication information succeeds, a specific user name is selected on the first selection screen and the verification information is received from the server, acquire signature information created by encrypting the verification information with a specific private key, the specific private key being a key corresponding to specific key information stored in association with specific user identification information corresponding to the selected specific user name in the first memory; and send the specific user identification information and the created signature information to the server, wherein the server is configured to decrypt the signature information by using a specific public key stored in association with the specific user identification information in the server, wherein the communication device further comprises an interface to which an authentication device comprising the first memory is connectable, wherein the first memory stores the plurality of user identification information, the plurality of key information and a plurality of user names corresponding to the plurality of user identification information in association with the one biometric authentication information, wherein the controller is configured to:

in a state where the authentication device is connected to the interface under the specific state, acquire from the authentication device the two or more user names among the plurality of user names stored in the first memory, and in the case where authentication for a target user using the one biometric authentication information succeeds, a specific user name is selected on the first selection screen and the verification information is received from the server, acquire from the authentication device signature information created by encrypting the verification information with a specific private key.

2. The communication device according to claim 1, wherein upon a determination that the authentication device is a first-type authentication device, the first memory is configured to store the plurality of user identification information, the plurality of key information and the plurality of user names in association with the one biometric authentication information, and upon a determination that the authentication device is a second-type authentication device different from the first-type authentication device, the first memory is configured to store the plurality of user identification information and the plurality of key information in association with the one biometric authentication information and is not configured to store the plurality of user names, wherein the controller is further configured to:

upon a determination that the authentication device is connected to the interface, receive type information indicating whether the authentication device is the first-type authentication device or the second-type authentication device from the authentication device;

upon a determination that the received type information indicates that the authentication device is the first-type authentication device in a state where the authentication device is connected to the interface under the specific state, acquire from the authentication device the two or more user names among the plurality of user names stored in the first memory; and upon a determination that the received type information indicates that the authentication device is the second-type authentication device in a state where the authentication device is connected to the interface under the specific state, acquire from the server the two or more user names stored in the server.

3. The communication device according to claim 1, further comprising a print executing unit, wherein the controller is further configured to:

in response to sending the signature information to the server, receive from the server one or more print data identification information stored in association with the specific user name in the server;

display on the display unit a second selection screen for selecting one print data identification information from the received one or more print data identification information;

in a case where specific print data identification information is selected on the second selection screen, send a print data request including the specific print data identification information to the server;

receive specific print data corresponding to the specific print data identification information from the server; and cause the print executing unit to execute printing using the received specific print data.

4. The communication device according to claim 3, further comprising a second memory, wherein the server is configured to shift from a logout state to a login state in a case where the verification information is acquired by decrypting the signature information by using the specific public key, wherein the controller is further configured to:

in a case where the one or more print data identification information are received from the server, store the one or more print data identification information in the second memory; and in a case where the printing using the specific print data fails due to occurrence of an error in the communication device, execute one of a first logout process, a second logout process and a third logout process, wherein the first logout process includes sending the server a logout request for requesting the server to shift from the login state to the logout state and deleting the one or more print data identification information from the second memory, the second logout process includes sending the server the logout request and does not include deleting the one or more print data identification information from the second memory, and the third logout process includes, in a case where a logout operation is accepted from the target user before the error is fixed, resuming the printing in response to the error being fixed and deleting the one or more print data identification information from the second memory after the printing is completed.

5. The communication device according to claim 4, wherein the second memory is configured to store a setting value related to logout, and the controller is configured to:

in a case where the setting value indicates a first value, execute the first logout process;

in a case where the setting value indicates a second value, execute the second logout process; and in a case where the setting value indicates a third value, execute the third logout process.

6. The communication device according to claim 3, further comprising an interface to which an authentication device comprising the first memory is connectable, wherein the controller is not configured to cancel the printing even when the authentication device is detached from the interface while the printing using the specific print data is being executed.

7. A communication device configured to operate according to a predetermined authentication scheme using a pair of keys, the communication device comprising:

a display unit; and a controller configured to:

under a specific state where a plurality of user identification information and a plurality of key information corresponding to the plurality of user identification information are stored in association with one biometric authentication information in a first memory, acquire two or more user names corresponding to two or more user identification information among the plurality of user identification information;

display, on the display unit, a first selection screen for selecting one user name from the acquired two or more user names;

in response to sending an authentication request to a server, receive verification information from the server;

in a case where authentication for a target user using the one biometric authentication information succeeds, a specific user name is selected on the first selection screen and the verification information is received from the server, acquire signature information created by encrypting the verification information with a specific private key, the specific private key being a key corresponding to specific key information stored in association with specific user identification information corresponding to the selected specific user name in the first memory; and send the specific user identification information and the created signature information to the server, wherein the server is configured to decrypt the signature information by using a specific public key stored in association with the specific user identification information in the server, wherein the communication device further comprises an interface to which an authentication device comprising the first memory is connectable, wherein the controller is configured to:

in a state where the authentication device is connected to the interface under the specific state, acquire from the server the two or more user names stored in the server, and in the case where authentication for a target user using the one biometric authentication information succeeds, a specific user name is selected on the first selection screen and the verification information is received from the server, acquire from the authentication device signature information created by encrypting the verification information with a specific private key.

8. The communication device according to claim 7, wherein the controller is configured to:

in the state where the authentication device is connected to the interface under the specific state, acquire from the server the two or more user names stored in the server in response to sending the server a user name request including authentication device identification information for identifying the authentication device, wherein each of the two or more user identification information is user identification information stored in association with the authentication device identification information among the plurality of user identification information stored in the server.

9. The communication device according to claim 7, further comprising a print executing unit, wherein the controller is further configured to:

in response to sending the signature information to the server, receive from the server one or more print data identification information stored in association with the specific user name in the server;

display on the display unit a second selection screen for selecting one print data identification information from the received one or more print data identification information;

in a case where specific print data identification information is selected on the second selection screen, send a print data request including the specific print data identification information to the server;

receive specific print data corresponding to the specific print data identification information from the server; and cause the print executing unit to execute printing using the received specific print data.

10. The communication device according to claim 9, further comprising a second memory, wherein the server is configured to shift from a logout state to a login state in a case where the verification information is acquired by decrypting the signature information by using the specific public key, wherein the controller is further configured to:

in a case where the one or more print data identification information are received from the server, store the one or more print data identification information in the second memory; and in a case where the printing using the specific print data fails due to occurrence of an error in the communication device, execute one of a first logout process, a second logout process and a third logout process, wherein the first logout process includes sending the server a logout request for requesting the server to shift from the login state to the logout state and deleting the one or more print data identification information from the second memory, the second logout process includes sending the server the logout request and does not include deleting the one or more print data identification information from the second memory, and the third logout process includes, in a case where a logout operation is accepted from the target user before the error is fixed, resuming the printing in response to the error being fixed and deleting the one or more print data identification information from the second memory after the printing is completed.

11. The communication device according to claim 10, wherein the second memory is configured to store a setting value related to logout, and the controller is configured to:

in a case where the setting value indicates a first value, execute the first logout process;

in a case where the setting value indicates a second value, execute the second logout process; and in a case where the setting value indicates a third value, execute the third logout process.

12. The communication device according to claim 9, further comprising an interface to which an authentication device comprising the first memory is connectable, wherein the controller is not configured to cancel the printing even when the authentication device is detached from the interface while the printing using the specific print data is being executed.

13. A non-transitory computer-readable recording medium storing computer-readable instructions for a communication device configured to operate according to a predetermined authentication scheme using a pair of keys:

wherein the computer-readable instructions, when executed by the communication device, cause the communication device to:

under a specific state where a plurality of user identification information and a plurality of key information corresponding to the plurality of user identification information are stored in association with one biometric authentication information in a first memory, acquire two or more user names corresponding to two or more user identification information among the plurality of user identification information;

display, on the display unit, a first selection screen for selecting one user name from the acquired two or more user names;

in response to sending an authentication request to a server, receive verification information from the server;

in a case where authentication for a target user using the one biometric authentication information succeeds, a specific user name is selected on the first selection screen and the verification information is received from the server, acquire signature information created by encrypting the verification information with a specific private key, the specific private key being a key corresponding to specific key information stored in association with specific user identification information corresponding to the selected specific user name in the first memory; and send the specific user identification information and the created signature information to the server, wherein the server is configured to decrypt the signature information by using a specific public key stored in association with the specific user identification information in the server, wherein the communication device further comprises an interface to which an authentication device comprising the first memory is connectable, wherein the first memory stores the plurality of user identification information, the plurality of key information and a plurality of user names corresponding to the plurality of user identification information in association with the one biometric authentication information, wherein in a state where the authentication device is connected to the interface under the specific state, the two or more user names among the plurality of user names stored in the first memory are acquired from the authentication device, and wherein in the case where authentication for a target user using the one biometric authentication information succeeds, a specific user name is selected on the first selection screen and the verification information is received from the server, wherein signature information created by encrypting the verification information with a specific private key is acquired from the authentication device.

14. A non-transitory computer-readable recording medium storing computer-readable instructions for a communication device configured to operate according to a predetermined authentication scheme using a pair of keys:

wherein the computer-readable instructions, when executed by the communication device, cause the communication device to:

under a specific state where a plurality of user identification information and a plurality of key information corresponding to the plurality of user identification information are stored in association with one biometric authentication information in a first memory, acquire two or more user names corresponding to two or more user identification information among the plurality of user identification information;

display, on the display unit, a first selection screen for selecting one user name from the acquired two or more user names;

in response to sending an authentication request to a server, receive verification information from the server;

in a case where authentication for a target user using the one biometric authentication information succeeds, a specific user name is selected on the first selection screen and the verification information is received from the server, acquire signature information created by encrypting the verification information with a specific private key, the specific private key being a key corresponding to specific key information stored in association with specific user identification information corresponding to the selected specific user name in the first memory; and send the specific user identification information and the created signature information to the server, wherein the server is configured to decrypt the signature information by using a specific public key stored in association with the specific user identification information in the server, wherein the communication device further comprises an interface to which an authentication device comprising the first memory is connectable, wherein in a state where the authentication device is connected to the interface under the specific state, the two or more user names stored in the server are acquired from the server, and wherein in the case where authentication for a target user using the one biometric authentication information succeeds, a specific user name is selected on the first selection screen and the verification information is received from the server, wherein signature information created by encrypting the verification information with a specific private key is acquired from the authentication device.

\* \* \* \* \*